US010031897B2

(12) United States Patent
Shuping et al.

(10) Patent No.: US 10,031,897 B2
(45) Date of Patent: *Jul. 24, 2018

(54) SYSTEM AND METHOD FOR WEB BROWSING

(71) Applicant: Flash3D LLC, Plano, TX (US)

(72) Inventors: David T. Shuping, Chantilly, VA (US); William R. Johnson, Leesburg, VA (US); Robert C. Randa, Rockville, MD (US)

(73) Assignee: Flash3D LLC, Plano, TX (US)

( * ) Notice: Subject to any disclaimer, the term of this patent is extended or adjusted under 35 U.S.C. 154(b) by 155 days.

This patent is subject to a terminal disclaimer.

(21) Appl. No.: 14/846,943

(22) Filed: Sep. 7, 2015

(65) Prior Publication Data
US 2016/0196243 A1  Jul. 7, 2016

Related U.S. Application Data

(63) Continuation of application No. 12/480,090, filed on Jun. 8, 2009, now Pat. No. 9,129,034, which is a (Continued)

(51) Int. Cl.
*G06F 3/0481* (2013.01)
*G06F 17/22* (2006.01)
*G06F 17/30* (2006.01)

(52) U.S. Cl.
CPC ........ *G06F 17/2247* (2013.01); *G06F 3/0481* (2013.01); *G06F 17/30882* (2013.01); *G06F 17/30905* (2013.01)

(58) Field of Classification Search
CPC ............. G06F 3/0481; G06F 17/30882; G06F 39/4443; G06F 17/224; G06F 17/309; G09G 5/14; G09G 5/14577
See application file for complete search history.

(56) References Cited

U.S. PATENT DOCUMENTS 6,133,916 A * 10/2000 Bukszar ............... G06F 17/211
715/744
6,253,188 B1 * 6/2001 Witek ................. G06Q 10/087
705/14.54

(Continued)

FOREIGN PATENT DOCUMENTS

WO      WO 97/29414    *  8/1997

*Primary Examiner* — Steven Sax

(57) ABSTRACT

A system and method for web browsing contemporaneously displays multiple web pages, advertisements, or other applications, preferably within a single window, for a user to view. In a preferred embodiment, a current web page, a past web page, a future web page, and/or an advertisement or other application are contemporaneously displayed in a single window. In this embodiment, the present invention tracks a past web page and renders it in a first panel, renders the current web page in a second panel, and identifies a hyperlink in the current web page to retrieve and render the future web page in a third panel. In other embodiments, a host provides a list of web pages that are to be displayed in the panels. In other embodiments, a user selects a list of web pages that are to be displayed in the panels. In other embodiments, hyperlinks are filtered and/or prioritized to determine which web pages are to be displayed in the panels. In this manner, the user contemporaneously views the current web page, the past page, and the future web page, or alternately, multiple web pages in the single window. Preferably, the present invention is implemented as a web browsing room in a three-dimensional space where walls of the rooms correspond to various ones of the aforementioned panels and a floor of which may be used to display advertisements or provide other applications. The user can view the web pages in the browsing room using various three-dimensional navigation techniques.

13 Claims, 8 Drawing Sheets

Related U.S. Application Data continuation of application No. 10/007,207, filed on Nov. 10, 2001, now Pat. No. 7,546,538, which is a continuation-in-part of application No. 09/985,415, filed on Nov. 2, 2001, now Pat. No. 7,624,348, which is a continuation of application No. 09/498,079, filed on Feb. 4, 2000, now Pat. No. 6,313,855.

(56) References Cited

U.S. PATENT DOCUMENTS

| | | | | |
|---|---|---|---|---|
| 6,300,947 | B1 * | 10/2001 | Kanevsky | G06F 17/30905 707/E17.121 |
| 6,360,222 | B1 * | 3/2002 | Quinn | G06F 17/30864 |
| 6,370,543 | B2 * | 4/2002 | Hoffert | G06F 17/30017 707/722 |
| 6,457,009 | B1 * | 9/2002 | Bollay | G06F 17/30864 707/770 |
| 6,490,602 | B1 * | 12/2002 | Kraemer | G06Q 30/06 715/236 |
| 6,496,203 | B1 * | 12/2002 | Beaumont | G06F 9/4443 715/744 |
| 6,546,393 | B1 * | 4/2003 | Khan | G06F 17/30884 |
| 6,601,057 | B1 * | 7/2003 | Underwood | G06F 17/21 707/770 |
| 6,654,725 | B1 * | 11/2003 | Langheinrich | G06Q 30/02 705/14.52 |
| 6,924,797 | B1 * | 8/2005 | MacPhail | G06F 3/0481 715/700 |
| 6,959,319 | B1 * | 10/2005 | Huang | G06F 17/30867 705/14.73 |
| 7,152,207 | B1 * | 12/2006 | Underwood | G06F 17/3089 715/207 |
| 7,236,969 | B1 * | 6/2007 | Skillen | G06F 17/30864 707/706 |
| 7,254,781 | B1 * | 8/2007 | Land | H04L 12/2856 715/760 |
| 7,263,558 | B1 * | 8/2007 | Khirman | G06Q 30/00 709/229 |
| 7,353,246 | B1 * | 4/2008 | Rosen | G06F 17/30855 707/999.01 |
| 7,610,218 | B2 * | 10/2009 | Bodmer | G06Q 30/06 705/26.41 |
| 7,627,507 | B1 * | 12/2009 | Drakeley | G06Q 40/00 705/35 |
| 7,630,986 | B1 * | 12/2009 | Herz | G06Q 10/10 |
| 7,844,594 | B1 * | 11/2010 | Holt | G06F 17/30719 707/706 |
| 9,129,034 | B2 * | 9/2015 | Shuping | G06F 17/30905 |
| 2002/0065744 | A1 * | 5/2002 | Collins | G06Q 30/06 705/26.64 |
| 2002/0087559 | A1 * | 7/2002 | Pratt | G06F 17/30893 |
| 2003/0061294 | A1 * | 3/2003 | Stennicke | G06F 17/30017 709/208 |
| 2003/0182184 | A1 * | 9/2003 | Strasnick | G06Q 30/02 705/14.66 |

* cited by examiner

SYSTEM AND METHOD FOR WEB BROWSING

CROSS-REFERENCE TO RELATED APPLICATIONS

The present application is a continuation application of U.S. application Ser. No. 12/480,090, entitled "System and Method for Web Browsing," which was filed on Jun. 8, 2009, and issued as U.S. Pat. No. 9,129,034 on Sep. 8, 2015; which in turn is a continuation application of U.S. application Ser. No. 10/007,207, entitled "System and Method for Web Browsing," which was filed on Nov. 10, 2001, and issued as U.S. Pat. No. 7,546,538 on Jun. 9, 2009; which in turn is a continuation-in-part application of U.S. application Ser. No. 09/985,415, entitled "System and Method for Web Browsing," which was filed on Nov. 2, 2001, and issued as U.S. Pat. No. 7,624,348 on Nov. 24, 2009; which in turn is a continuation of U.S. application Ser. No. 09/498,079, entitled "System and Method for Web Browsing," which was filed on Feb. 4, 2000, and issued as U.S. Pat. No. 6,313,855 on Nov. 6, 2001. The contents of all of the above-referenced applications are hereby incorporated by reference.

BACKGROUND

Field of the Invention

The present invention relates generally to web browsers and more particularly to a web browser that displays a current web page along with past web pages, future web pages, advertisements, and/or other applications in a unique browsing environment.

Discussion of the Related Art

The Internet has dramatically changed the manner in which we access, gather, and collect information. Often referred to as the "World Wide Web," the Internet provides a user with a host of "web pages." A web page is rendered from web page data that may be retrieved from a source of web page data, often via the Internet using various well-known protocols. The web page data is often in the form of a hypertext mark-up language (e.g., HTML, DHTML, XML, etc.) or a scripting language (e.g., Java, JavaScript, etc.), and often includes a reference or hyperlink (i.e., a URL address) to another web page. The web page data may include other forms of source language and other forms of data as would be apparent. Once the web page data is rendered, the web page may be displayed to the user for viewing. The actions of selecting a web page, retrieving web page data associated with the web page, rendering that data, and displaying the web page to the user is often referred to as "web browsing."

Various conventional web browsing engines, or web browsers as they are commonly referred, are available. These web browsers may, for example, include Microsoft's Internet Explorer™ and Netscape's Navigator™. These web browsers facilitate web browsing and provide the user with a host of browsing features including bookmarks and history functions.

However, one of the problems associated with conventional web browsers is that typically, only one web page is rendered at any given time for display to the user. Conventional methods for overcoming this problem include the user opening a second instance of the web browser and manually switching back and forth between the instances, or alternately, the user manually moving and/or resizing a window in which each instance operates so that the respective instances can be contemporaneously viewed.

Another problem associated with conventional web browsers is navigating to previously visited web pages. Conventional web browsers typically maintain a list of previously visited or "past" web pages. This list of past web pages provides a history of the web pages visited by the user during a particular session. At various times, the user may return to a past web page, for example, by using a pull down menu to select a particular past web page from the history list. However, the list is cumbersome to use as the past web page is not always readily identifiable among the truncated URL references maintained in the back history list. As a result, the user must often navigate backwards through the history list in order to return to the desired past web page. The user may also return to a past web page by selecting a "backward" navigation button available on a tool bar of conventional web browsers. The backward button navigates the user sequentially one page at a time through the history list as is well known.

Another problem associated with conventional web browsers is that future web pages are not viewable from a currently displayed web page. A future web page is a web page that is referenced via a hyperlink on a current web page. Future web pages are not viewable with conventional web browsers until the user selects that hyperlink. In order to determine whether a particular web site includes anything of interest, the user must manually select each hyperlink to have the web browser retrieve and render the hyperlinked web pages.

Another problem associated with conventional web browsing is that parties other than the user (such as web site owners, networks hosts, etc.) do not have the ability to assist web browsers with navigation beyond visible hyperlinks. These other parties can only provide one web page at a time using conventional browsers and must rely on the user to navigate the web site using hyperlinks.

Another problem associated with conventional web browsing is that advertisements tend to obscure other content that a web site may wish to display to the user. Advertisers and web site owners also have little control over the length of time advertisements are visible by the user and have a difficult time tracking advertisement impressions due to system technologies such as web page caching.

What is needed is an improved system and method for web browsing.

SUMMARY OF THE INVENTION

The present invention provides a system and method for web browsing. Generally speaking, the present invention contemporaneously displays multiple web pages, preferably within a single window, for the user to view. In one embodiment of the present invention, a current web page and a past web page may be contemporaneously displayed in a single window. In this embodiment, the present invention tracks a past web page and renders it in a first panel, and renders the current web page in a second panel, all preferably embedded within a single window. In this manner, the user is able to view both the current web page and the past page in a single window.

In another embodiment of the present invention, a current web page and a future web page are contemporaneously displayed. In this embodiment, the present invention locates a hyperlink to a future web page in web page data associated with the current web page and automatically retrieves the corresponding web page data associated with the future web page. The present invention renders the current web page in a first panel, and renders the future web page in a second panel, preferably embedded within a single window. In this manner, the user is able to view both the current web page and the future web page in a single window.

In another embodiment of the present invention, a past web page, a current web page, and a future web page are contemporaneously displayed within a single window. This embodiment of the present invention incorporates both the past web page as well as the future web page aspects of the previously described embodiments. According to this embodiment, the present invention renders the current web page in a first panel, renders the past web page in a second panel, and renders a future web page in a third panel.

In yet another embodiment of the present invention, the panels for rendering the various web pages are provided in a three-dimensional space. Preferably, these panels are provided as walls in a browsing room in which a user is able to navigate. In this embodiment, the user is able to navigate in the room using well-known techniques whereby the user may change his perspective (i.e., view different walls from various angles), zoom in, zoom out, etc., in the three-dimensional space. Preferably, in an embodiment employing a room with three walls, the left wall includes the past web page, the center wall includes the current web page, and the right wall includes the future web page. In other embodiments of the present invention, any number of panels for displaying various web pages within the three-dimensional space may exist.

In yet still another embodiment of the present invention, a plurality of past web pages are rendered in a panel. In one embodiment of the present invention, each of the plurality of past web pages is rendered as a thumbnail or reduced size image. In another embodiment of the present invention, each of the plurality of past web pages is rendered as a fully functional web page in an active web browser. Preferably, the number and/or organization of these web pages may be configured according to user preference.

In still another embodiment of the present invention, a plurality of future web pages are rendered in a panel. Preferably, each of the future web pages referenced via a hyperlink on the current web page is rendered in the panel. In one embodiment of the present invention, each of the plurality of future web pages is rendered as a thumbnail or reduced size image. In another embodiment of the present invention, each of the plurality of future web pages is rendered as a fully functional web page in an active web browser. Preferably, the number and/or organization of these web pages may be configured according to user preference.

In yet still another embodiment of the present invention, a party other than the user specifies which of a plurality of prioritized web pages are rendered in at least one panel. In this embodiment, a "host," which may include a web site owner, a network manager, or some other party, selects each of the prioritized web pages to be rendered in at least one panel by the present invention. In one embodiment, a list of references to the prioritized web pages is included in web page data associated with the current page. In other embodiments, the list may be provided in another manner or from another source. In any case, the host may provide information to identify an order or arrangement for displaying the prioritized web pages as well as the panel or panels in which they are to be displayed. In the aforementioned embodiments, the prioritized web pages may or may not be accessible from the current web page via a hyperlink. In one embodiment of the present invention, each of the prioritized web pages is rendered as a thumbnail or reduced size image. In another embodiment of the present invention, each of the prioritized web pages is rendered as a fully functional web page in an active web browser.

In still yet another embodiment of the present invention, a user selects the prioritized web pages that are rendered in at least one panel from among the web pages selectable via a current web page. In this embodiment, while viewing a current web page having hyperlinks, for example, to future web pages, the user may select a subset of, or "prioritize," those hyperlinks to be rendered in at least one panel by the present invention. In this manner, the user is able to continue viewing the current web page, while the prioritized web pages are being retrieved and rendered in another panel. This may be useful, for example, when the user desires to view only certain web pages accessible from a particular web page and not necessarily all the web pages accessible links therefrom. This embodiment is also useful for accelerating the user's browsing experience as the user is able to browse the current web page after making his selections knowing that they are being retrieved and rendered in a separate panel for viewing at his convenience. In one embodiment of the present invention, each of the prioritized web pages is rendered as a thumbnail or reduced size image. In another embodiment of the present invention, each of the prioritized web pages is rendered as a fully functional web page in an active web browser.

In yet another embodiment of the present invention, a list of prioritized web pages are determined by browsing patterns of a user during one or more previous web browsing sessions. In this embodiment of the present invention, a history of the hyperlinks selected from a particular web page is stored. When the particular web page is subsequently revisited by the user, either in the same browsing session or a subsequent browsing session, the history is used to determine which of the hyperlinks to use to retrieve and render prioritized web pages in at least one panel. In further embodiments of the present invention, a frequency of visits may be associated with the prioritized web pages to positionally rank them in the at least one panel. In one embodiment of the present invention, each of the prioritized web pages is rendered as a thumbnail or reduced size image. In another embodiment of the present invention, each of the prioritized web pages is rendered as a fully functional web page in an active web browser.

One of the features of the present invention is that the past web page may be viewed contemporaneously with the current web page. This feature also preferably allows the user to return to the past web page by selecting it, for example, by clicking on it, in its respective panel.

Another feature of the present invention is that the future web page may be viewed contemporaneously with the current web page. This feature allows the user to navigate a web site more rapidly by viewing a future web page from its appearance rather than by some obtuse description. This feature also preferably allows the user to go to the future web page by selecting it in its respective panel.

Yet another feature of the present invention is that the prioritized web page may be viewed contemporaneously with the current web page. This feature allows the host to select and/or prioritize the web pages viewed by the user in a multi-page browsing environment. This feature also allows the user to go to the prioritized web page by selecting it in its respective panel.

Yet another feature of the present invention is that the browsing room in the three-dimensional space may include a floor, for example, that may display various system information such as number of bytes downloaded, number of bytes to download, download rate, download time, download time remaining, etc. The floor may also be used to provide a panel for displaying advertisements from the web site owner or other content provider. The floor may also be used to include saved or cached information downloaded on a periodic basis. This information may include advertisements or reminders that are relevant to the current web page or to a profile associated with the user.

Yet still another feature of the present invention is that a user may designate a past web page as a "sticky" web page. Such a designation indicates that the sticky web page remains in its respective panel (and at its designated position, if appropriate) regardless of additional past web pages generated by subsequent browsing. In other words, the past web page so designated "sticks" on the panel until the user releases the designation.

Still another feature of the present invention is that a user may designate a future web page as a sticky web page. Such a designation indicates that the sticky web page remains in its respective panel (and at its designated position, if appropriate) regardless of new future web pages generated by the selection of a new current web page as a result of subsequent browsing. In other words, the future web page so designated "sticks" on the panel until the user releases the designation.

These and other features and advantages of the present invention will become apparent from the following drawings and description.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The present invention is directed to a system and method for web browsing that displays multiple web pages thereby allowing a user to contemporaneously view more than a single web page in a single window. More particularly, the present invention is directed to a system and method for web browsing that contemporaneously displays a past web page, a current web page, a future web page, a prioritized web page, and/or advertisements or other applications for viewing by the user, preferably within a three-dimensional space.

Figure 1:
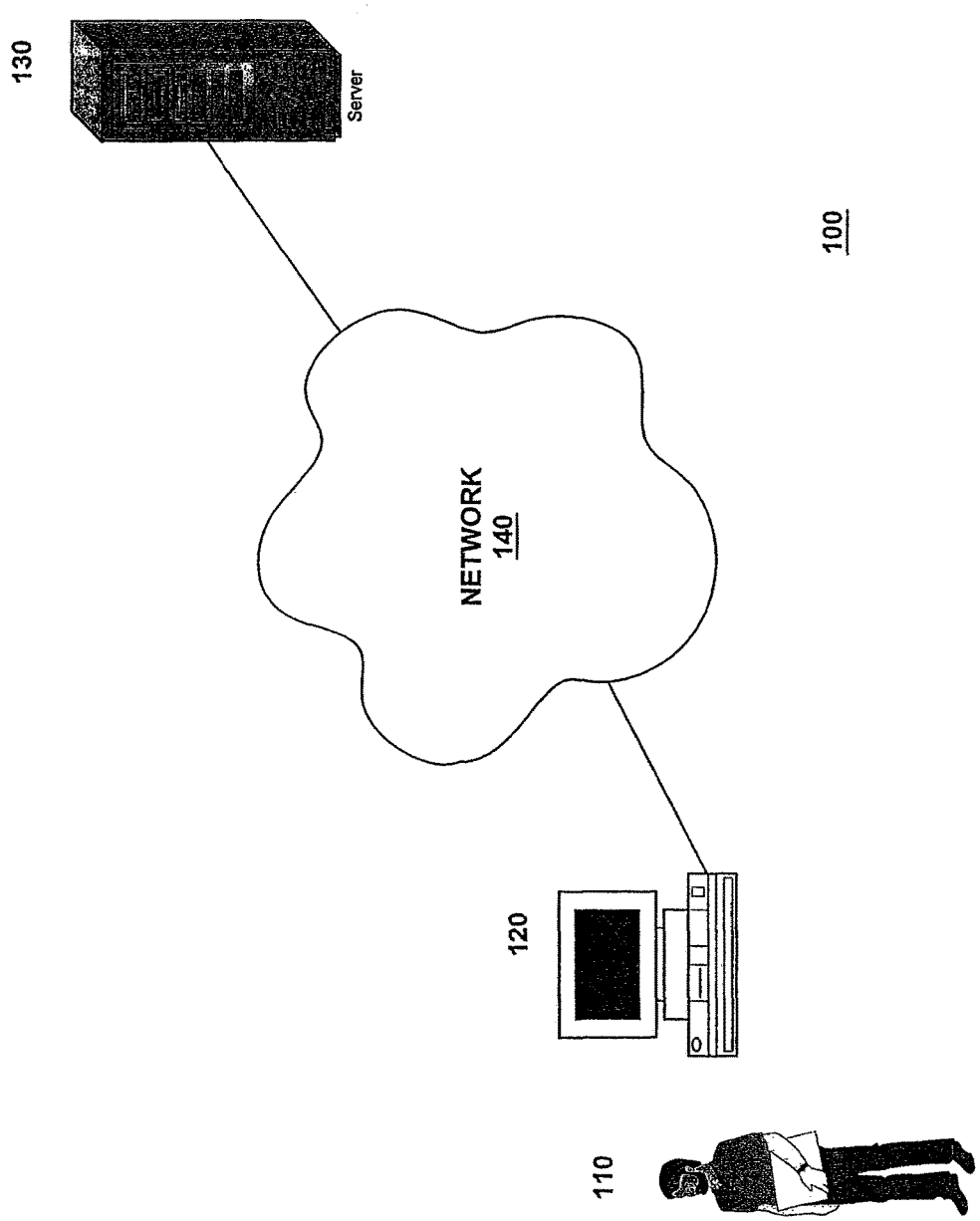
FIG. 1 illustrates a computer network that facilitates web browsing.

FIG. 1 illustrates a computer network 100 including a user 110 participating in a web browsing session via a computer 120 connected to at least one server 130 via a network 140. Computer 110 may be any electronic communicating device capable of interfacing with network 140. Such devices may include computers, laptops, telephones, cellular phones, personal data accessories ("PDA"), pagers, web enabled televisions ("WebTV"), or other similar electronic communication devices, as would be apparent. Network 140 may be any form of interconnecting network including an intranet, such as a local or wide area network, or an extranet, such as the World Wide Web, or the Internet. Such networks 140 may include various wireless connections as would be apparent. Server 130 may be any sort of storage device for providing web page data to users as would be apparent.

During a browsing session, user 110 accesses a particular web page using a web browser (also referred to as web browsing engine) such as Microsoft's Internet Explorer™ or Netscape's Navigator™ operating on computer 120. In order to access a web page, the web browser sends a request to a particular web site using a Uniform Resource Locator ("URL") address associated with the desired web page. The request is passed through network 140 using an appropriate network protocol. For example, when network 140 comprises the Internet, a Hyper Text Transfer Protocol ("HTTP") is used that encapsulates the request to facilitate its transmission through network 140. Other network protocols may also be used as would be apparent.

Using the URL address, the request is routed to a server (or servers) 130 hosting the web page. Once located, the appropriate server 130 analyzes the request and sends web page data corresponding to the request back to computer 120 using the appropriate network protocol (e.g., HTTP). The browser receives the web page data at computer 120. This process of requesting and retrieving web page data is well known.

The web page data includes various markup language data (e.g., HTML, DHTML, XML, etc.), scripting language data (e.g., Java, JavaScript, etc.), and various other data and or files (e.g., image files) that comprise the content of the web page as is well known. The web page data may also include a reference, sometime referred to as a "hyperlink." Typically, the hyperlink is an embedded URL address to another web page. The web browser renders the web page data into a web page and facilitates the display of the web page in a "window" on computer 120 in a well-known manner.

Figure 2:
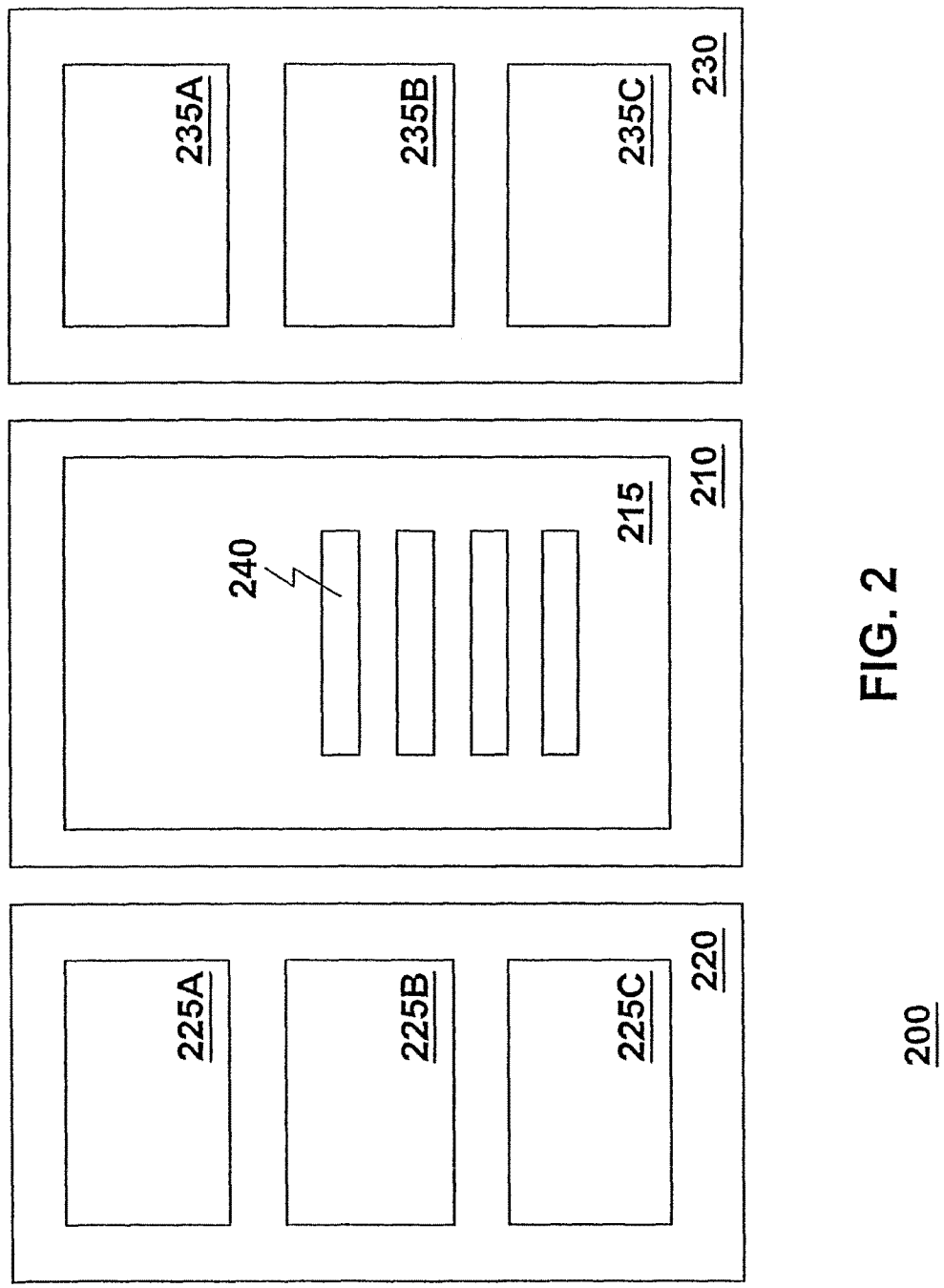
FIG. 2 illustrates a web browser according to one embodiment of the present invention.

FIG. 2 illustrates a web browser 200 operating in a single window according to the present invention. Web browser 200 includes a current panel 210 and at least one of a past panel 220 and a future panel 230. Preferably, web browser 200 includes both past panel 220 and future panel 230.

Current panel 210 includes a current web page 215. Current panel 210 preferably operates in a manner similar to a conventional web browser. In a preferred embodiment of the present invention, an active conventional web browser is mapped onto current panel 210. From current panel 210, user 110 may access various web pages in a conventional manner using the conventional web browser. In a preferred embodiment of the present invention, the conventional web browser "plugs in" to web browser 200 thereby providing web browser 200 with a web browsing engine to perform these conventional aspects of the present invention. This concept of plugging a conventional web browser into web browser 200 is referred to as a "reverse plug-in." Plug-ins are generally well known.

Past panel 220 operates in connection with current page 210 to display at least one past web page 225 (illustrated in FIG. 2 as past web pages 225A-C). In a preferred embodiment of the present invention, past panel 220 includes one or more web browsing engines embedded therein (i.e., its own instances of the web browsing engine) for managing past web page 225. In another embodiment, the present invention generates a thumbnail or reduced size image using the web page data associated with past web page 225 and renders the thumbnail or reduced size image in panel 220 using various well-known techniques.

In this manner, user 110 may view one or more past web pages 225 in past panel 220 contemporaneously with current web page 215 in current panel 210. Preferably, user 110 may configure past panel 220 to display, for example, "X" number of past web pages 225 organized in a "m by n" matrix. In one embodiment of the present invention, during a browsing session, the present invention shifts the least recent past web page 225 off past panel 220 to accommodate more recent past web pages 225.

In operation, when user 110 selects a new web page, current web page 215 is transferred to past panel 220. To accommodate this transfer, the present invention shifts past web pages 225 by one web page location, thereby eliminating one web page from past panel 220, if necessary. For example, past web page 225C may represent the least recent past web page, and past web page 225A may represent the most recent past web page. In this example, when user 110 selects a new web page, past web page 225C is shifted off past panel 220, past web page 225B is shifted to the location formerly occupied by past web page 225C, and past web page 225A is shifted to the location formerly occupied by past web page 225B. Current web page 215 is then transferred to past panel 220 and positioned at the location formerly occupied by past web page 225A. The present invention then renders the new selected web page as current web page 215 in current panel 210.

In addition to displaying past web pages 225, web browser 200 provides a mechanism whereby any of past web pages 225 may be recalled as current web page 215. This mechanism is in addition to other mechanisms for selecting web pages with a conventional web browser. In particular, user 110 may "click on" a past web page 225 in past panel 220 to restore that web page as current web page 215 in current panel 210. In one embodiment, the present invention maintains an associated URL address for each of past web pages 225 so that they may be recalled in this manner.

Future panel 230 operates in connection with current page 210 to display at least one future web page 235 (illustrated in FIG. 2 as future web pages 235A-C). Future web page 235 is a web page referenced in a hyperlink 240 included in current web page 215. In other words, future web page 235 may be thought of as a preview of the web page that would otherwise be conventionally retrieved if user 110 selected hyperlink 240. In a preferred embodiment of the present invention, future panel 230 includes one or more web browsing engines embedded therein (i.e., instances of the web browsing engine) for managing future web pages 235. In another embodiment, the present invention generates a thumbnail or reduced size image using the web page data associated with future web page 235 and renders the thumbnail or reduced size image in future panel 230 using well-known techniques.

In this manner, user 110 may view one or more future web pages 235 in future panel 230 contemporaneously with current web page 215 in current panel 210. Preferably, user 110 may configure future panel 230 to display, for example, "X" number of future web pages 235 organized in a "m by n" matrix.

In operation, when user 110 selects a new web page, web browser searches the web page data associated with the new web page for any hyperlinks 240 included therein. If a hyperlink 240 is located, web browser automatically retrieves the web page data referenced by hyperlink 240 and renders it as future web page 235 in future panel 230. In this manner, user 110 may view future web pages 235 without having to manually "drill down" to them via hyperlinks 240.

In addition to displaying future web pages 235, web browser 200 provides a mechanism whereby any of future web pages 235 may be selected as current web page 215. In particular, user 110 may "click on" a future web page 235 to select the web page as current web page 215 in current panel 210. In one embodiment of the present invention, web browser 200 maintains an associated URL address for each of future web pages 235 so that user 110 can access them from future panel 230.

In some embodiments of the present invention, web browser 200 may prioritize or filter hyperlinks 240 found in the web page data associated with the new web page. Where prioritization occurs, higher priority hyperlinks 240 have their associated future web pages 235 rendered in superior positions in future panel 230 than do lower priority hyperlinks 240. Where filtering occurs, some future web pages 235 are not retrieved and rendered based on their hyperlinks 240. Many prioritization or filtering schemes exists. For example, in some embodiments, hyperlinks 240 that are outside a domain associated with the new web page may be given higher priority over those inside the domain or vice versa. In other embodiments, hyperlinks 240 may or may not be retrieved or rendered on future panel 230 based on whether they are within a domain associated with the new web page. In still other embodiments, hyperlinks 240 may be filtered or prioritized based on a preferred, or alternately, undesired, list of web sites; hyperlinks 240 may be filtered or prioritized based on a type or form of the underlying content (e.g., images, text, advertising, etc.); hyperlinks 240 may be filtered or prioritized based on age of the content; hyperlinks 240 may be filtered or prioritized based on its uniqueness (i.e., filter out links common to other web pages); hyperlinks 240 may be filtered or prioritized based on frequency (i.e., filter out multiple links to the same web page); etc. Filtering or prioritization schemes may be selected by user 110, configured at installation or during operation, and/or specified by a network administrator or host as would be apparent.

In other embodiments of the present invention, web browser 200 allows a party other than the user, i.e., a "host," to specify one or more prioritized web pages to be displayed in past panel 220, future panel 230 or both. In these embodiments, the host provides web browser 200 with a list of one or more references associated with the prioritized web pages. This list may be included within web page data associated with current page 210. The list may include references of web pages that are also referenced in a hyperlink 240 included in current web page 215 as well as references of web pages that are not included therein as hyperlinks. The list of references may be predetermined or may be generated dynamically based upon, for example, known or determined user preferences, past navigation techniques, or other known means. The list may include or be accompanied by information that may specify an order, an arrangement, a location, a panel, or other form of organization for any of the prioritized web pages.

In one embodiment of the present invention, the list is provided in web page data associated with current web page 215 by a web site owner as script recognized by web browser 200 and ignored by conventional web browsers. In this manner, hosts can extend their web sites to operate with multi-page browsing environments such as web browser 200 thereby controlling presentation of multiple web pages among various panels 210, 220, and 230, while continuing to support operation with conventional web browsers.

In another embodiment of the present invention, web browser 200 is configured to communicate with a source other than the web site owner of current web page 215 for the list of references to the prioritized web pages. In this embodiment, the source may be a network manager associated with a company for which the user is employed. In another embodiment, the source may be a party that provides the user with the references to prioritized web pages having content similar or related to that included in current web page 215. In other embodiments, the source may be a party that provides the user with the references to prioritized web pages related to his preferences or patterns of web browsing. Various other hosts may provide various other prioritized web pages as would be apparent. In any case, the references may be communicated as script or web page data similar to that described above.

As with the other embodiments of the present invention, panels 220, 230 may include one or more web browsing engines embedded therein (i.e., instances of the web browsing engine) for managing the prioritized web pages. In other embodiments, the present invention generates a thumbnail or reduced size image using the web page data associated with the prioritized web pages and renders the thumbnail or reduced size image in panels 220, 230 using well-known techniques.

In this manner, user 110 may view one or more prioritized web pages in panels 220, 230 contemporaneously with current web page 215 in current panel 210. As discussed above, the host may configure panels 220, 230 to display, for example, "X" number of prioritized web pages organized in a "m by n" matrix. Alternately or in conjunction with the host, user 110 may configure panels 220, 230 in a similar manner.

In operation, when user 110 selects a new web page, web browser 200 searches the web page data associated with the new web page for references, if any, to prioritized web pages included therein. Alternately, web browser 200 receives the references to the prioritized web pages via other mechanisms. If such references are located or received, web browser 200 automatically retrieves the web page data so referenced and renders it as a prioritized web page in panel 220, 230. In this manner, the host may specify and user 110 may view multiple web pages.

In addition to displaying the prioritized web pages, web browser 200 may also provide a mechanism whereby any of the prioritized web pages may be selected as current web page 215. In particular, user 110 may "click on" a prioritized web page to select it as current web page 215 in current panel 210. In one embodiment of the present invention, web browser 200 maintains an associated URL address for each of the prioritized web pages so that user 110 can access them from panel 220, 230.

In other embodiments of the present invention, web browser 200 allows user 110 to designate one or more user selectable prioritized web pages to be displayed in past panel 220, future panel 230 or both. In these embodiments, user 110 designates one or more hyperlinks 240 accessible from a particular web page, such as current page 215 in current panel 210, as user selectable prioritized web pages. Designating hyperlinks 240 (and their underlying web pages) as user selectable prioritized web pages may be accomplished using various well known techniques, including, for example, by using a menu item on a tool bar, by "clicking" a left mouse button on hyperlink 240 while simultaneously holding down the <SHIFT> key or the <CTRL> key, or by "clicking" a right mouse button on hyperlink 240 for a pull down menu, "dragging and dropping" hyperlink 240 to panel 220, 230 etc. Other techniques may be used as would be apparent. Once designated as a user selectable prioritized web page, web browser 200 automatically retrieves the web page data associated therewith and renders it as a user selectable prioritized web page in panel 220, 230. In this manner, user 110 may continue to view and browse current web page 215 in current panel 210 while the user selectable prioritized web pages are being retrieved and rendered in panel 220, 230. In addition, user 110 may designate multiple pages or a group of pages to be prioritized and displayed in panel 220, 230 by selecting only one hyperlink that accesses multiple prioritized pages automatically.

This embodiment of web browser 200 differs from conventional web browsers in at least two manners. First, web browser 200 allows user 110 to select multiple web pages from current web page 215 for retrieval and rendering in panel 220, 230 in a somewhat parallel fashion as opposed to selecting single web pages in a sequential fashion as with conventional web browsers. Second, web browser 200 distinguishes between selecting a hyperlink 240 from current web page 215 in current panel 210, which retrieves and renders the appropriate web page data as a new current web page in current panel 210, and designating one or more hyperlinks 240 from current web page 215 as a prioritized web page, which retrieves and renders the appropriate web page data as a prioritized web page in panel 220, 230 while current web page 215 remains in current panel 210.

As with the other embodiments of the present invention, panels 220, 230 may include one or more web browsing engines embedded therein (i.e., instances of the web browsing engine) for managing the user selectable prioritized web pages. In other embodiments, the present invention generates a thumbnail or reduced size image using the web page data associated with the user selectable prioritized web pages and renders the thumbnail or reduced size image in panels 220, 230 using well-known techniques.

In this manner, user 110 may view one or more user selectable prioritized web pages in panels 220, 230 contemporaneously with current web page 215 in current panel 210. As discussed above, user 110 may configure panels 220, 230 to display, for example, "X" number of prioritized web pages organized in a "m by n" matrix.

During operation of this embodiment of the present invention, when user 110 selects a new web page, web browser 200 retrieves and renders the new web page as current web page 215 in current panel 210, but may or may not automatically search the web page data associated with the new web page for references to additional web pages included therein. This may be included as a user selectable switch in web browser 200 as would be apparent that turns off subsequent automatic retrieval and rendering of future web pages 235 in future panel 230. In any case, when user 110 designates one or more references from current web page 215 as a user selectable prioritized web page, web browser 200 retrieves the web page data associated therewith and renders it as one or more prioritized web pages in panel 220, 230. In this manner, user 110 may specify and view current web page 215 along with the user selectable prioritized web pages.

In addition to displaying the user selectable prioritized web pages, web browser 200 may also provide a mechanism whereby any of the user selectable prioritized web pages, once rendered, may be subsequently selected as current web page 215. In particular, user 110 may "click on" a user selectable prioritized web page in panel 220, 230 to select it as current web page 215 in current panel 210. In one embodiment of the present invention, web browser 200 maintains an associated URL address for each of the user selectable prioritized web pages so that user 110 can access them from panel 220, 230.

In addition to designating user selectable prioritized web pages by selecting specific hyperlinks 240 in current web page 215, some embodiments of web browser 200 allow user 110 to identify a start position in current web page 215 from which to begin retrieving and rendering prioritized web pages. In these embodiments, user 110 positions a cursor within web page 215 and "clicking," etc., with this feature selected from either a toolbar or menu. Web browser 200 determines a corresponding position of the cursor in web page data associated with current web page 215 and begins retrieving and rendering references from that point onward. For example, user 110 may not wish to view future web pages 235 associated with hyperlinks 240 that appear near the top of current web page 215 but would rather view those that appear closer to the bottom of current web page 215. This feature may be useful when current web page 215 has many hyperlinks 240.

In other embodiments of the present invention, web browser 200 stores a history of web pages browsed by user 110 from a particular web page. This history provides the list of prioritized web pages to retrieve and render in panel 220, 230 when the particular web page is selected as current web page 215 in current panel 210. This history may be built from a single browsing session or compiled over multiple browsing sessions. This history may include a frequency that each of the prioritized web pages is selected from the particular web page. Using this history, web browser 200 may automatically retrieve and render those web pages typically browsed by user 110 in panel 220, 230, when user 110 selects the particular web page as current web page 215. In some embodiments, the frequency that each of the prioritized web pages is selected may be used to position the prioritized web pages in panel 220, 230 as would be apparent.

For example, during a particular browsing session, a user selects "Web Page A" and subsequently browses "Web Page X," "Web Page Y," and "Web Page Z," from "Web Page A" but does not browse "Web Page L," "Web Page M," or "Web Page N" also referenced from "Web Page A." In a subsequent browsing session, or later during the same browsing session, when user 110 selects "Web Page A" as current web page 215, web browser 200 automatically retrieves and renders "Web Page X," "Web Page Y," and "Web Page Z" in panel 220, 230 as prioritized web pages whereas "Web Page L," "Web Page M," and "Web Page N" may not be rendered or alternately, may be rendered in positions in panel 220, 230 that are inferior to those of the prioritized web pages.

In various embodiments of the present invention, web browser 200 includes a search feature that searches the scene of web browsing room 300 for a particular item, which may include, but is not limited, to a string, text, characters, images, file types, objects, or other searchable item as would be apparent. In some embodiments, the search may be performed on a "live" scene or one previously stored and/or bookmarked. In some embodiments, the search may be performed in active web pages, static web pages, or both. In some embodiments, the search may be performed within those web pages displayed in browsing room 300, or any portion thereof (i.e., individual panels 210, 22, 230 or walls 310, 320, 330). In some embodiments, the search may be performed within those web pages displayed in browsing room 300, or any portion thereof, as well as the web pages to which any of them reference. In some embodiments, the search may be performed within those web pages displayed in browsing room 300, or any portion thereof, as well as the web pages found in the same or similar domains or any portion of those domains. Other searches may also be performed within browsing room and its associated web pages as would be apparent.

In one embodiment of the present invention, web browser 200 controls separate display devices, one for each of past panel 220, current panel 210 and future panel 230, organized as a so-called "tri-monitor" for web browsing. A single computer 120 may control the output to each of the display devices providing a full screen view for each of panels 210, 220, 230. Techniques for providing separate outputs to multiple display devices are well known.

Figure 3:
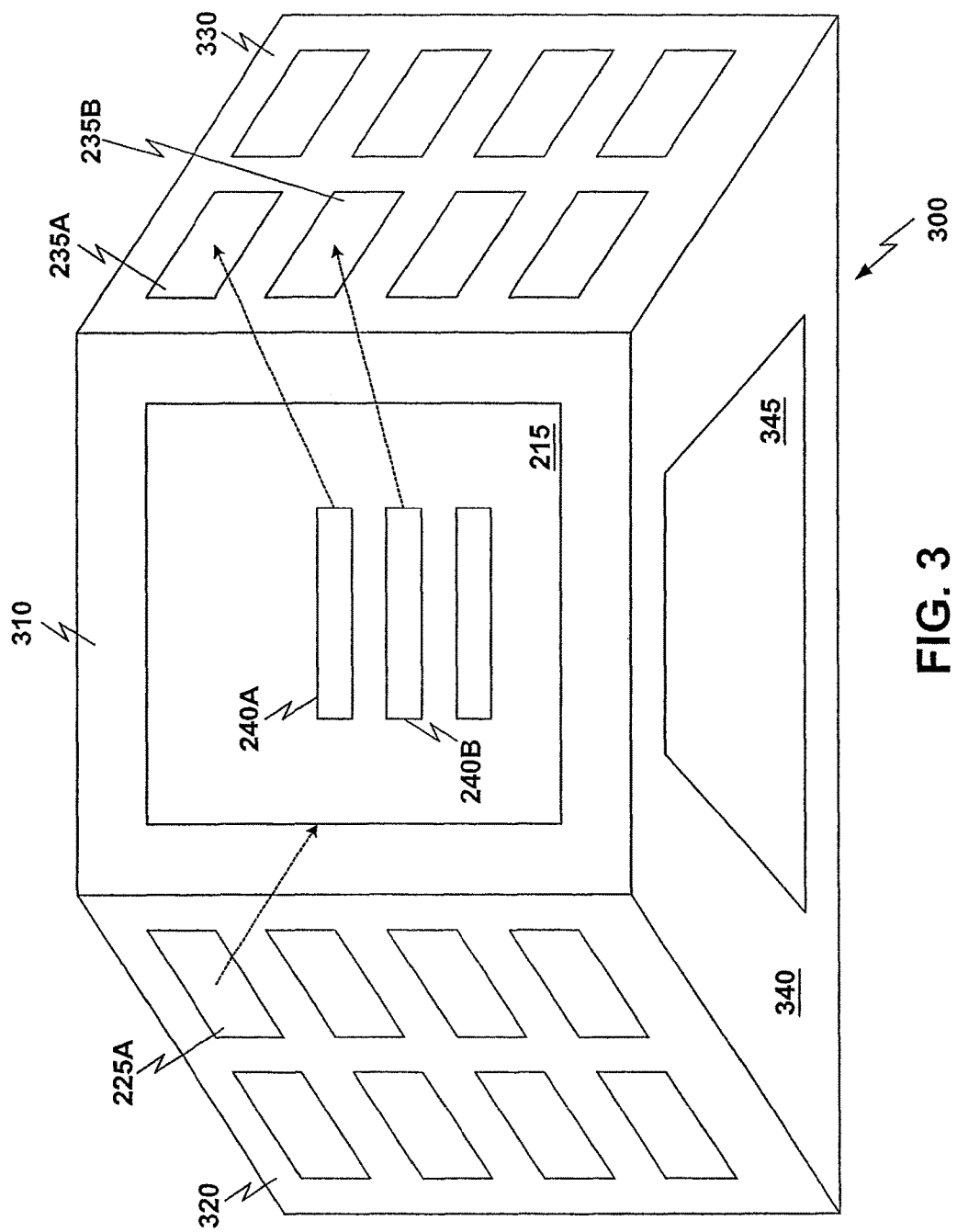
FIG. 3 illustrates a web browser according to one embodiment of the present invention.

FIG. 3 illustrates a preferred embodiment of the present invention. In particular, FIG. 3 illustrates a browsing room 300 operating in a three-dimensional environment or space. Browsing room 300 includes a current wall 310 and at least one of a past wall 320 and a future wall 330. Preferably, browsing room 300 includes both past wall 320 and future wall 330. These walls 310, 320, and 330 operate in a manner similar to their counterpart panels 210, 220 and 230 as described above. In one embodiment of the present invention, browsing room 300 may also include a floor 340, including a floor panel 345, which is described in further detail below.

In one embodiment of the present invention, browsing room 300 and the three-dimensional environment are implemented using various well known three dimensional rendering tools such as OpenGL™ available from Silicon Graphics Incorporated or DirectX™ available from Microsoft. These tools allow various abstractions including active objects (e.g., web browsers) and passive objects (e.g., images) to be embedded on objects in the three-dimensional environment.

Preferably, user 110 is able to navigate in browsing room 300 according to well-known three-dimensional navigation techniques. In browsing room 300, user 110 may, for example, change his perspective to view only one of walls 310, 320, 330. User 110 may also zoom in to a particular wall to get a closer view of, for example, past web page 225A or future web page 235A. User 110 may also zoom out to simultaneously view all walls 310, 320, 330 and floor 340. Other features associated with navigating a three-dimensional space such as browsing room 300 are also contemplated as would be apparent.

In a preferred embodiment, each of walls 310, 320, and 330 include one or more instances of active conventional web browsers. For example, each of past web pages 225 would include the active web browser, as well as each of future web pages 235, in addition to the active web browser operating in current wall 320. In this embodiment, each web page 215, 225 and 235 is active and dynamic, capable of receiving updates, etc., in a conventional manner. Other embodiments of the present invention, specifically those constrained by, for example, processing power or network bandwidth, may be restricted to a single active conventional web browser operating in current web page 215. In these embodiments, web pages 225 and 235 are preferably thumbnail or reduced size images rendered in walls 320 and 330, respectively.

As illustrated in FIG. 3, browsing room 300 provides user 110 with a visualization of where he has been and/or where he is going during a particular browsing session. For example, past wall 320 includes one or more past web pages 225 including a past web page 225A. In a preferred embodiment, past web page 225A, as illustrated in FIG. 3, occupies a location of the most recently visited past web page. In other words, user 110 visited past web page 225A just prior to selecting current web page 215. Other arrangements of past web pages 225 in past wall 320 may be made as would be apparent.

In one embodiment of the present invention, past web page 225A includes a hyperlink 240 to current web page 215. In this embodiment, user 110 arrives at current web page 215 by selecting hyperlink 240 on past web page 225A when it was the current web page. This relationship is illustrated in FIG. 3 by a dotted arrow connecting past web page 225A with current web page 215. Other mechanisms exist for arriving at current web page 215 without using hyperlink 240 on past web page 225A as would be apparent.

Future wall 330 includes one or more future web pages 235 including, for example, a future web page 235A and a future web page 235B. In one embodiment, future web page 235A, as illustrated in FIG. 3, occupies a location of the first reference or hyperlink found in web page data associated with current web page 215. Future web page 235B occupies a location of the second reference or hyperlink found in the web page data associated with current web page 215. In an alternate embodiment of the present invention, future web pages 235 occupy locations in future wall 330 based on various indicia associated with each future web page 235. For example, future web pages 235 may be organized by their respective popularity as determined by a number of hits each receives. Alternately, future web pages 235 may be organized based on their respective dates of being updated. Other arrangements of future web pages 235 in future panel 330 using these and other criteria may be made as would be apparent.

As discussed above, current web page 215 includes a reference or hyperlink 240 to a future web page 235. Current web page 215 includes hyperlinks 240A and 240B that correspond to future web pages 235A and 235B, respectively, as indicated by dotted arrows in FIG. 3. User 110 may arrive at current web page 215 in any manner. Once web page data associated with current web page 215 is received, the present invention locates any of hyperlinks 240 included therein. The present invention retrieves and renders future web page 235 corresponding to each of the located hyperlinks 240 included in the web page data and displays them in future wall 330.

In a preferred embodiment of the present invention, any of past web pages 225 or future web pages 235 may become current web page 215 by clicking on past web page 225 in past wall 320 or future web page 235 in future wall 330, respectively. The present invention stores or otherwise maintains a reference (i.e., a URL address) for each past web page 225 in past wall 320 and for each future web page 235 in future wall 330. Thus, when user 110 selects a particular past web page 225 (for example, past web page 225A), the particular past web page 225 on past wall 320 becomes current web page 215 on current wall 310. Likewise, when user 110 selects a particular future web page 235 (for example, future web page 235A), the particular future web page 235 on future wall 330 becomes current web page 215 on current wall 310.

In some embodiments of the present invention, prioritized web pages, either those selected by user 110, a host, or other party as described above may be included in either past wall 320 and/or future wall 330.

In some embodiments of the present invention, user 110 may "drag and drop" any of web pages 215, 225, 235 to any wall 310, 320, 330 and/or position therein. After doing so, the scene in web browsing room 300 is rerendered in accordance with various aspects of the invention. This allows user 110 to organize web pages 215, 225, 235 as would be apparent.

In one embodiment of the present invention, any of past web pages 225 and future web pages 235 may become sticky web pages on their respective walls 320 and 330. When a user 110 designates a particular web page 225, 235 as a sticky web page, that web page 225, 235 remains at the designated location on the respective wall 320, 330 regardless of changes in current web page 215. For example, if user 110 designates past web page 225A as a sticky web page, past web page 225A remains in the illustrated location regardless of additional past web pages 225 generated as a result of subsequent browsing. Likewise, if user 110 designates future web page 235A as a sticky web page, future web page 235A remains in the illustrated location regardless of new future web pages 235 generated from hyperlinks 240 on any new current web pages 215 selected during subsequent browsing. User 110 may also designate current page 215 to become a sticky page on walls 320 or 330.

In one embodiment, sticky web pages may be transferred to a separate panel in browsing room 300 (e.g., another wall, a ceiling, a floor, etc.). In this embodiment, the user may also "drag and drop" the web page 225, 235 to a so-called "sticky surface" to designate the web page as a sticky web page. Once on the sticky surface, web page 225, 235 remains there until removed by user 110.

In other embodiments, sticky web pages may be reorganized on the same panel in room 300. In one embodiment, user 110 may either drag and drop or use some other form to designate that one or more of the sticky pages should be reorganized on the same page. In other embodiments user 110 may use a "retile" operation to reorganize all sticky web pages on a panel thereby eliminating open locations thereon. For example if future web pages 235A and 235C were designated as sticky web pages, user 110 may retile the sticky web pages to automatically move future web page 235C to future web page 235B.

In other embodiments, user 110 may also eliminate or remove all non-sticky pages from room 300. Non-sticky pages would be removed by selecting the appropriate menu selection or toolbar icon. Sticky pages could then be rearranged by one of the methods as described above. Various other mechanisms and combinations for clearing non-sticky pages from browsing room 300 are available as would be apparent.

User 110 may designate web page 215, 225, 235 as a sticky web page, for example, by right clicking on web page 215, 225, 235 and selecting an appropriate choice from a menu to designate the web page as a sticky window. Other mechanisms for designating web page 225, 235 as a sticky web page are available as would be apparent. The sticky web page remains in its designated location until user 110 releases the sticky web page. When web page 215 is designated as sticky, typically a copy of web page 215 is moved to either wall 320 or 330 and designated as sticky.

In some embodiments of the present invention, web browser 200 may collect bookmarks from a "Favorites" folder (such as that found in Internet Explorer, Netscape Navigator, etc.) and designate and render them as sticky web pages in web browsing room 300 as discussed above. Likewise, web browser 200 may add an entry in the "Favorites" folder when a web page 225, 235 is designated as a sticky web page and/or vice versa.

In one embodiment of the present invention, user 110 may bookmark current web page 215. According to one embodiment of the present invention, when user 110 bookmarks current web page 215, an entire scene of browsing room 300 is stored for later recall. In other words, the bookmark includes not only a reference to current web page 215, but also to each of past web pages 225 and future web pages 235 as well as their respective locations so that the entire scene of browsing room 300 may be recreated. In another embodiment of the present invention, the bookmark need only include the reference to current web page 215 and the references to past web page 225 as the references to future web pages 235 may be found in the web page data associated with current web page 215. In yet another embodiment of the present invention, the bookmark includes the reference to current web page 215 as well as references and designated locations for each of the sticky web pages in browsing room 300. In still another embodiment of the present invention, the bookmark only includes a reference to current web page 215. In yet still another embodiment of the present invention, user 110 may select from any of the above-described methods of bookmarking as would be apparent. Various other mechanisms and combinations for bookmarking browsing room 300 are available as would be apparent.

In some embodiments of the present invention, web browser 200 distinguishes between "active" bookmarks and "static" bookmarks. An active bookmark is a bookmark to a location of web page data generally where the underlying web page data may change periodically. A static bookmark is a bookmark to specific web page data that has been stored, in some cases local to user 110, so that it does not change and remains "static" as it was when bookmarked. Static bookmarks are used when user 110 desires the underlying web page data to be preserved as it existed when bookmarked whereas active bookmarks are used when user 110 desires updated web page data. In some embodiments of the present invention, a scene of browsing room 300 may be actively bookmarked. In these embodiments, references to the various web pages 215, 225, 235 are stored. In some embodiments of the present invention, a scene of browsing room 300 may be statically bookmarked. In these embodiments, the underlying web page data associated with the various web pages 215, 225, 235 are stored. In some embodiments, user 110 may designate which of web pages 215, 225, and 235 in browsing room 300 to actively bookmark and which to statically bookmark when the scene in browsing room 300 is bookmarked. In these embodiments, user 110 may designate one instance of a particular web page 225, 235 with an active bookmark and another instance of the particular web page 225, 235 with a static bookmark to facilitate identifying and tracking changes made in the particular web page.

In some embodiments of the present invention, web browser 200 may store an entire scene of web browsing room 300 as a file to a storage device, using either active bookmarks, static bookmarks, or a combination of the two. For those web pages 215, 225, 235 designated with active bookmarks, a reference (e.g., a URL) to web page data associated with the web page 215, 225, 235 is stored to the file along with information regarding its location, etc., within the scene. For those web pages 215, 225, 235 designated with static bookmarks, the web page data itself is stored to the file along with information regarding its location, etc., within the scene. This file may then be transferred or shared among users 110 as would be apparent. Subsequently selecting this file within web browser 200 would retrieve and recreate the scene within browsing room 300 in accordance with any active/static designations.

In some embodiments of the present invention, web browser 200 is adapted as a viewer capable of retrieving and rendering stored scenes.

In some embodiments of the present invention, past wall 320 and future wall 330 may not be large enough to include all of past web pages 225 or future web pages 235, respectively. For example, when current web page 215 includes a large number of hyperlinks 240, or during a long browsing session, walls 320, 330 may not include a sufficient number of locations to accommodate all of the corresponding web pages 225, 235. With respect to past wall 320, in one embodiment of the present invention, the least recent past web pages simply are shifted off of past wall 320. With respect to future wall 330, in one embodiment of the present invention, future web pages 235 may be included in future wall 330 in a "first come, first served" manner or alternately, based on the popularity of each of future web page 235.

In another embodiment of the present invention, a scroll feature may be incorporated into each of past wall 320 and future wall 330. For example, a "page down" and a "page up" button may be included in each wall 320, 330 to display a virtually infinite number of additional web pages 225, 235. In yet another embodiment of the present invention multiple past walls 320 and/or future walls 330 may be used to accommodate additional web pages 225, 235 respectively.

In one embodiment of the present invention, a host provides a list of prioritized web pages to be displayed in browsing room 300. In this embodiment, the host provides user 110 with a multi-page web browsing environment by specifying multiple web pages to display in walls 310, 320, and/or 330. The host may also specify an order, a location, an arrangement, etc., of the prioritized web pages among walls 310, 320, and 330. By way of example and not limitation, when user 110 requests current web page 215, a host such as a web site owner may provide in the associated web page data, references to prioritized web pages that are to be displayed in walls 320, 330 in connection with current web page 215 in current wall 310. In this manner, the host can tailor its web site toward browsing room 300. In alternate embodiments, the host may provide prioritized web pages unrelated to current web page 215 and directed toward user 110.

In one embodiment of the present invention, browsing room 300 includes floor 340. Floor 340 may include various status information associated with web browsing. Such status information may include, but is not limited to, a number of bytes to download, a number of bytes already downloaded, a rate at which bytes are being downloaded, a total time to complete the download, a time remaining to complete the download, and/or a plethora of other statistics associated with downloading web page data as would be apparent.

In another embodiment of the present invention, floor 340 includes an application program such as a clipboard. Preferably, the clipboard accepts various input from "cut and paste" operations from any of web pages 215, 225, 235. This input may be in the form of data, text, diagrams, images, etc., as would be apparent. The clipboard may be used to build various documents, presentations, etc., using various data available on the Internet. Other applications such as spreadsheets, word processes, etc., may be incorporated into floor 340 (or other surface) in a similar manner.

In general, advertising may be provided in any of walls 310, 320, 330. However, in some embodiments of the present invention, floor 340 includes floor panel 345 that may be used to provide advertising to user 110. Floor panel 345 may be configured to provide advertising associated with current web page 215 that otherwise obstructs viewing of current web page 215. In other embodiments of the present invention, floor panel 345 may also provide advertising generated in connection with any of web pages 215, 225, 235 in their respective walls. In yet other embodiments of the present invention, floor panel 345 provides advertising unrelated to any of web pages 215, 225, 235.

In some embodiments of the present invention, a web page associated with the advertising in floor panel 345 may become current web page 215 by clicking on the advertising in floor panel 345. The present invention stores or otherwise maintains a reference (i.e., a URL address) for the web page associated with the advertising. Thus, when user 110 selects the advertising, the associated web page becomes current web page 215 on current wall 310. Alternately, floor panel 345 may include a separate web browsing engine for providing the web page associated with the advertising in floor panel 345 itself so as to not obscure content in any of walls 310, 320, 330. In other embodiments of the present invention, floor panel 345 may operate in accordance with or supplemental to any of walls 310, 320, or 330.

In another embodiment of the present invention, any of walls 310, 320, 330 and floor panel 345 may include an application such as a video conferencing display or a streaming video application. In these embodiments, the application may be coordinated with the other walls 310, 320, 330, and floor panel 345 to form a browsing room 300 of homogeneous or supportive information associated with the content of the video.

Figure 9:
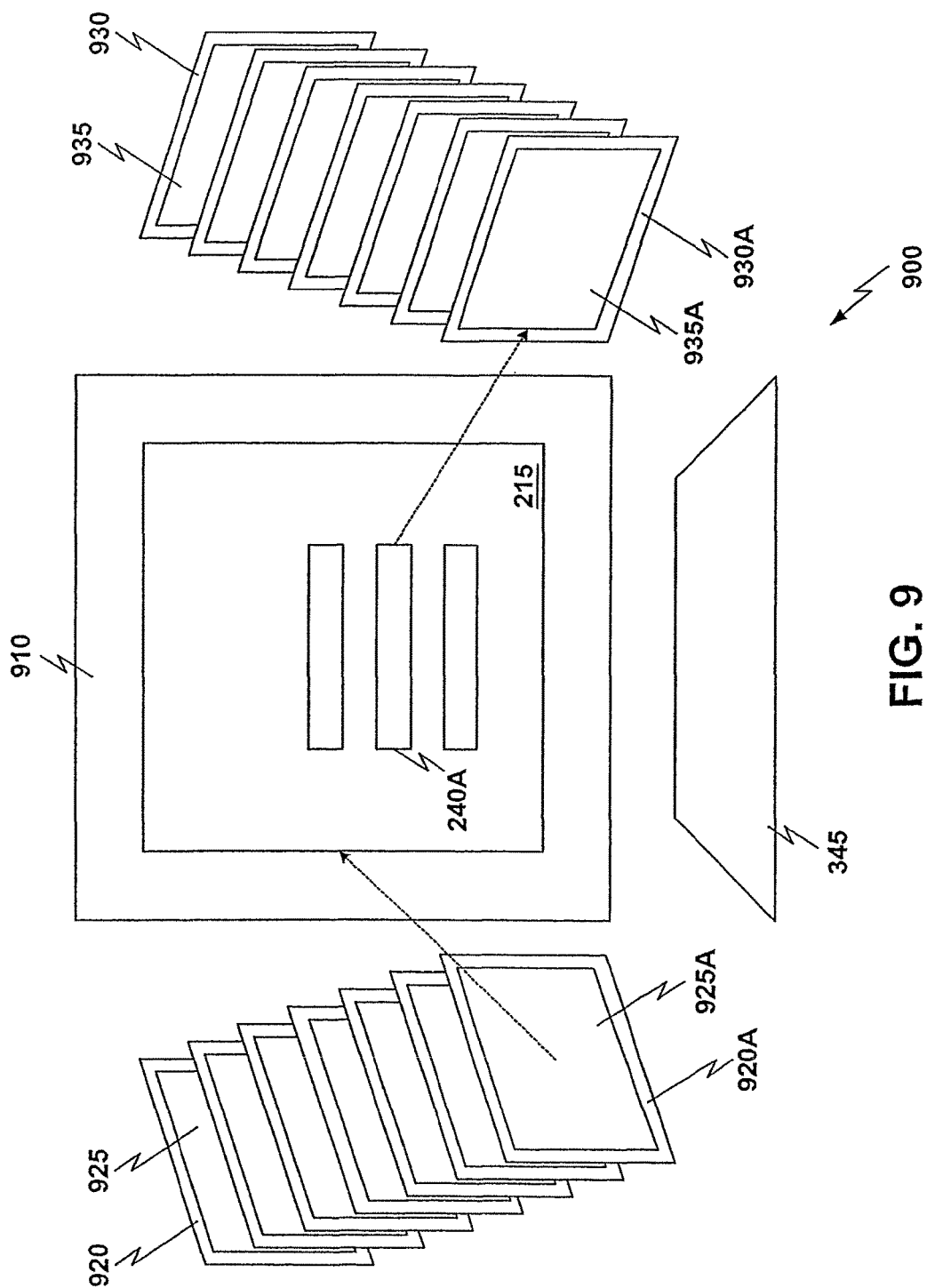
FIG. 9 illustrates a web browser according to one embodiment of the present invention.

FIG. 9 illustrates a web browser 900 operating in a three dimensional environment that includes a current panel 910, a plurality of past panels 920 and a plurality of future panels 930. Other panels (not illustrated) may be included in web browser 900 such as a floor panel, a ceiling panel, a sticky page panel, etc. User 100 may navigate through the three-dimensional environment of web browser 900 to view any of the web pages included therein.

Current panel 910 operates in a manner similar to that described above with respect to current panel 210. Specifically, current panel 910 includes current web page 215 having one or more hyperlinks (illustrated as hyperlink 240A).

Each of past panels 920 includes at least one past web page 925. For example, past panel 920A includes a past web page 925A. As illustrated, past panels 920 are arranged in a tiled fashion preferably organized from a most recent past panel 920 in the foreground to a least recent past panel 920 in the background. However, any arrangement of past panels 920 in three dimensional space is contemplated. As also illustrated, past web page 925A in past panel 920 includes a reference to current web page 215 in current panel 910.

Each of future panels 930 includes at least one future web page 935. For example, future panel 930A includes a future web page 935A. As illustrated, future panels 930 are arranged in a tiled fashion. Various mechanisms for organizing future panels 930 exist, some of which are described above. Likewise various arrangements of future panels 930 in three-dimensional space is contemplated. As also illustrated, current web page 215 includes hyperlink 240A to future web page 935A in future panel 930A.

Past panels 920 and future panels 930 operate in a manner similar to their counterparts as described above and as described in further detail below. In this embodiment however, rather than shifting the least recent past web page 925 off past panel 930, a new past panel may be created to accommodate additional past web pages 925. Likewise, rather than selecting a subset of hyperlinks 240 to be included in future panel 930, a sufficient number of future panels 930 are generated to accommodate the corresponding future web pages 935. Virtually an infinite number of past panels 920 and/or future panels 930 may be included in web browser 900.

The operation of web browser 200 is now described with reference to FIGS. 2 and 4-8. As will become apparent from reading the following description, the operation of web browser 200 applies equally to the operation of browsing room 300 illustrated in FIG. 3.

Figure 4:
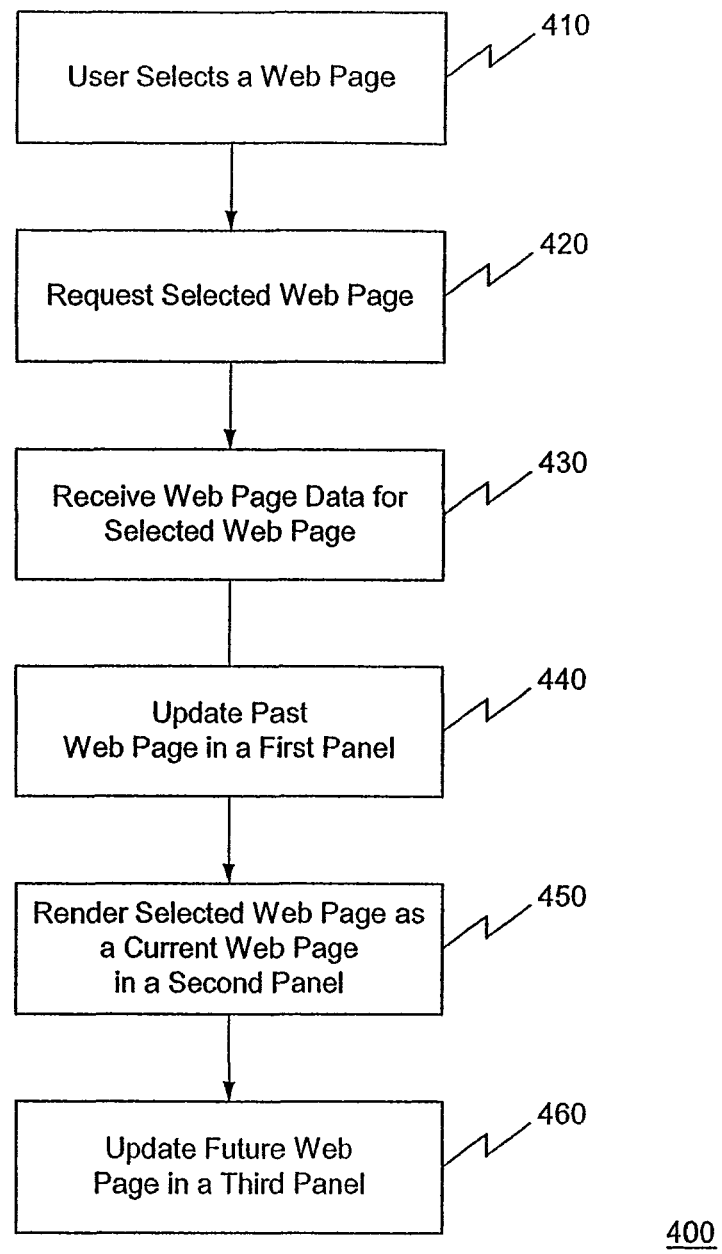
FIG. 4 illustrates an operation of the web browser according to one embodiment of the present invention.
Figure 5:
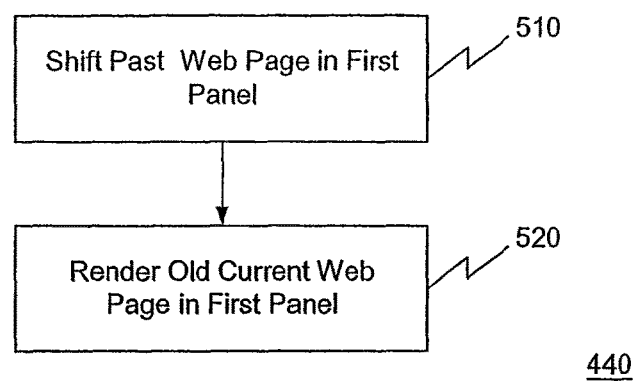
FIG. 5 illustrates an operation of updating past web pages according to one embodiment of the present invention.

FIG. 4 illustrates an operation 400 of web browser 200 according to a preferred embodiment of the present invention. In a step 410, user 110 selects a web page according to one of several techniques available for selecting web pages. In response to the selection by user 110, in a step 420, web browser 200 requests the selected web page from an appropriate source of web pages in accordance with the operation of network 140. In a step 430, web browser 200 receives the web page data associated with the selected web page.

After receiving the selected web page data, in a step 440, web browser 200 updates past web page 225 in a first panel (e.g., past panel 220, past wall 320, etc.). Step 440 is now described according to one embodiment of the present invention in further detail with reference to FIG. 5. In a step 510, each of past web pages 235 is shifted in the first panel to a next less recent location to accommodate the old current web page 215. In this step, the least recent past web page 225 is shifted off the first panel. In a step 520, the old current web page 215 is rendered in the first panel as the most recent past web page 225.

Figure 6:
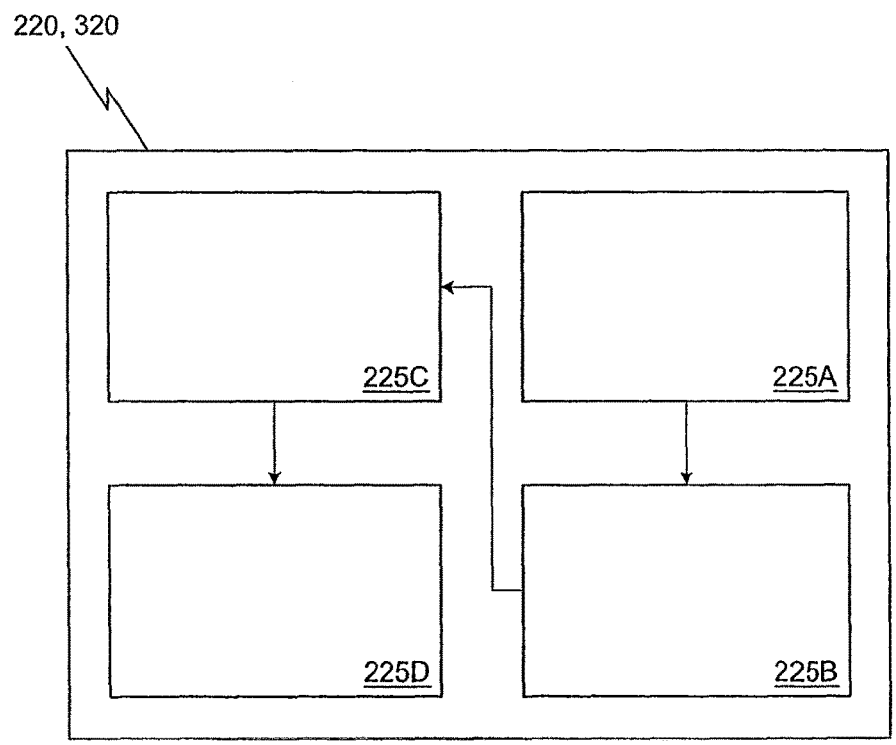
FIG. 6 illustrates an organization of past web pages according to one embodiment of the present invention.

FIG. 6 is an exemplary organization for past web pages 225 in first panel (e.g., past panel 220, past wall 320). As illustrated, past web page 225A is the most recent past web page, past web page 225B is the next most recent past web page, past web page 225C is the next least recent past web page; and past web page 225D is the least recent web page. During step 510, past web page 225D is shifted off the first panel; past web page 225C is shifted to the location of past web page 225D; past web page 225B is shifted to the location of past web page 225C; and past web page 225A is shifted to the location of past web page 225B. During step 520, the old current web page 215 is rendered in the location of past web page 225A, thereby becoming the most recent past web page 225. Other organizations and mechanisms for shifting past web pages 225 on the first panel exist as would be apparent.

With reference again to FIG. 4, in a step 450, web browser 200 renders the selected web page data as a new current web page 215 in a second panel (e.g., current panel 210, current wall 310, etc.) according to well-known techniques for rendering web pages. In a step 460, web browser 200 updates future web page 235 in a third panel (e.g., past panel 230, past wall 330) thereby completing the operation of web browser 200 with respect to current page 215.

Figure 7:
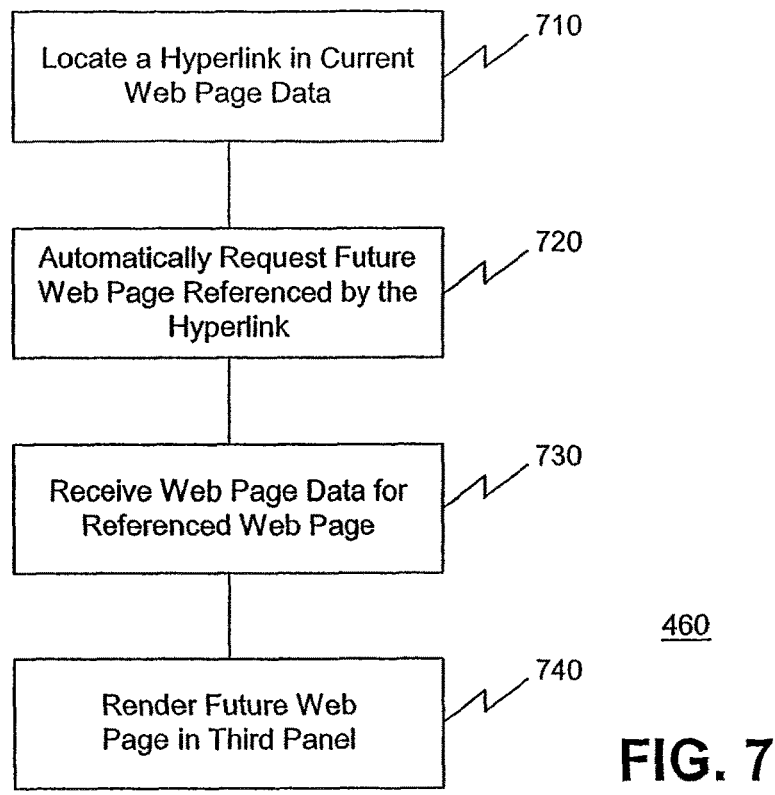
FIG. 7 illustrates an operation of updating future web pages according to one embodiment of the present invention.

Step 460 is now described according to one embodiment of the present invention in further detail with reference to FIG. 7. In a step 710, web browser 200 locates a hyperlink 240 in web page data associated with current web page 215.

In a step 720, web browser 200 automatically requests a future web page 235 corresponding to hyperlink 240. Web browser 200 performs this step without action by user 110 with respect to future web page 235. In other words, user 110 does not otherwise select future web page 235 prior to web browser 200 requesting future web page 235. In a step 730, web browser 200 receives web page data associated with future web page 235 from server 130. After this web page data is received, in a step 740, web browser 200 renders future web page 235 in the third panel.

Figure 8:
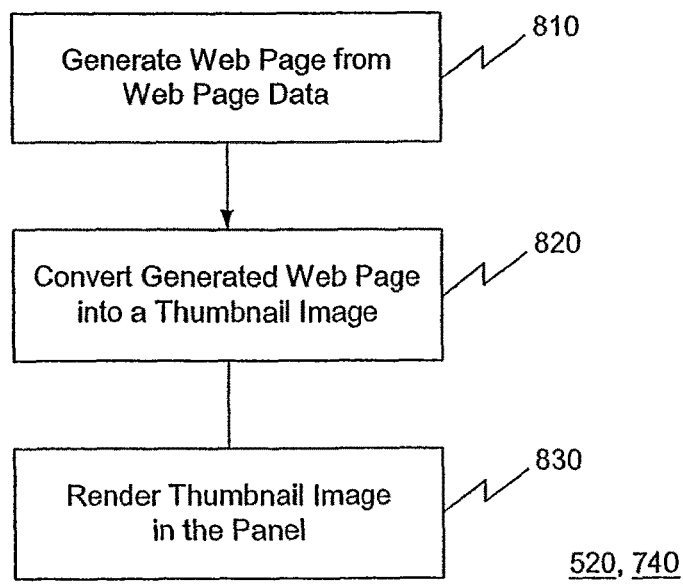
FIG. 8 illustrates an operation of generating a thumbnail or reduced size image from web page data according to one embodiment of the present invention.

In one embodiment of the present invention, rendering steps 520 and 740 render web pages 225 and 235, respectively, according to well-known techniques for rendering web pages. In an alternate embodiment of the present invention, rendering steps 520 and 740 operate as illustrated in FIG. 8. In a step 810, web browser 200 generates a web page (e.g., past web page 225, future web page 235) from the corresponding received web page data. In a step 820, web browser 200 converts the generated web page into a thumbnail or reduced size image. In a step 830, the thumbnail or reduced size image is mapped onto the appropriate panel according to well-known texture mapping techniques.

Figure 10:
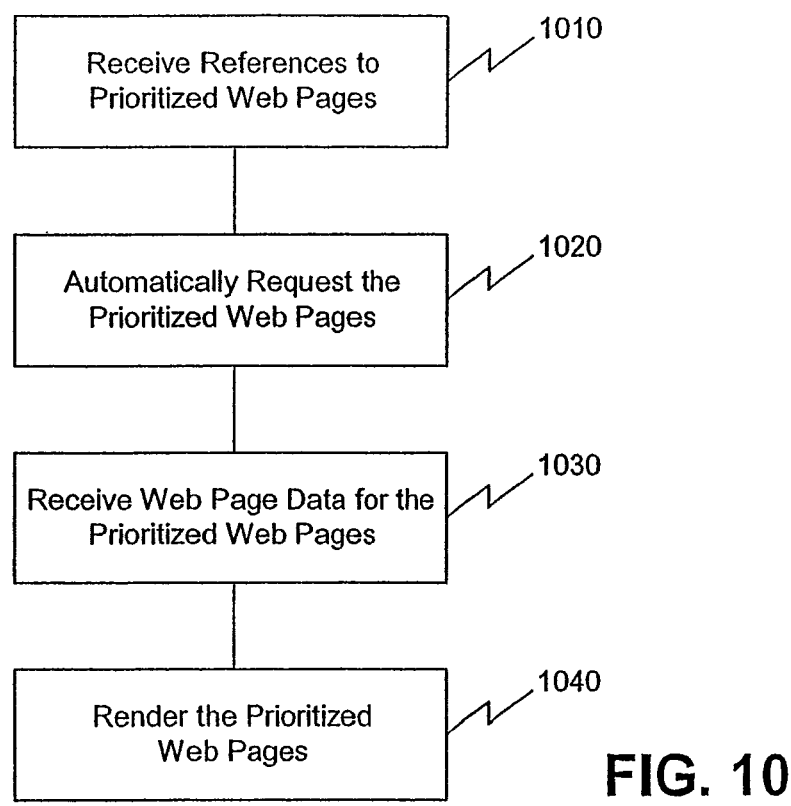
FIG. 10 illustrates an operation of providing prioritized web pages according to one embodiment of the present invention.

FIG. 10 illustrates an operation of the present invention in embodiments including prioritized web pages. In a step 1010, web browser 200 receives a list of references to one or more prioritized web pages. As discussed above, in one embodiment of the present invention, web browser 200 receives this list in web page data associated with current web page 215. In another embodiment of the present invention, web browser 200 receives this list from another host in connection with a request for a web page. In other embodiments, web browser 200 receives this list from a host during start-up, periodically, randomly, or at some other point unrelated to requests for web pages. In still other embodiments, web browser 200 receives this list after a user action, i.e., a right or left mouse click, mouseover, etc. Regardless of the source of this list, in a step 720, web browser 200 automatically requests the prioritized web pages corresponding to the list of references. Web browser 200 performs this step without action by user 110 with respect to the prioritized web pages. In other words, user 110 does not otherwise select prioritized web pages prior to web browser 200 requesting them. In a step 730, web browser 200 receives web page data associated with the prioritized web pages from one or more servers 130. After this web page data is received, in a step 740, web browser 200 renders the prioritized web pages in any of panels 220, 230. In one embodiment of the present invention, in step 740, web browser 200 renders the prioritized web pages in panels 220, 230 as specified by information accompanying or associated with the list of references.

While the present invention has been described in terms of a preferred embodiment, other embodiments and variations are within the scope of the following claims.

What is claimed is:

1. A method for browsing web pages comprising:
in each of a plurality of browsing sessions, receiving first web page data including a plurality of references, wherein the first web page data comprises content of a first web page, wherein said plurality of references are respectively associated with web page data for a plurality of other web pages, and wherein each of said plurality of references comprises a respective hyperlink to a respective web page in the plurality of other web pages;

storing a history of references selected from said plurality of references by a user to hyperlink from the first web page during the plurality of browsing sessions;

receiving indicia specifying a subset of said plurality of references, said indicia comprising a prioritized list of references determined using said history;

in an other browsing session, rendering the first web page using said first web page data in a first area of a window;

in the other browsing session, automatically requesting web page data associated with said subset of said plurality of references; and in the other browsing session, rendering reduced size images using said requested web page data in a second area of the window, wherein each reduced size image is configured for hyperlinking responsive to user selection, and wherein the reduced size images are arranged in the second area according to prioritization of the prioritized list.

2. The method of claim 1, wherein the reduced size images that are arranged in the second area according to prioritization of the prioritized list comprise:

a first reduced size image that is configured for hyperlinking to a second web page and that is disposed in the second area at a first location;

a second reduced size image that is configured for hyperlinking to a third web page and that is disposed in the second area at a second location; and a third reduced size image that is configured for hyperlinking to a fourth web page and that is disposed in the second area at a third location, wherein the first location represents higher priority than the second location, and the second location represents higher priority than the third location, wherein a most recent hyperlink by the user to the second web page occurred more recently than a most recent hyperlink by the user to the third web page, wherein the most recent hyperlink by the user to the third web page occurred more recently than a most recent hyperlink by the user to the fourth web page, and wherein the method further comprises, responsive to determining that the user has hyperlinked from the first web page to a fifth web page:

removing the third reduced size image from the third location;

moving the second reduced size from the second location to the third location;

moving the first reduced size image from the first location to the second location; and rendering at the first location a fourth reduced size image that is configured for hyperlinking to the fifth web page.

3. The method of claim 1, wherein said prioritization of the prioritized list prioritizes according to time since last selection, with more recent selection providing higher prioritization.

4. The method of claim 1, wherein said indicia further specify a plurality of different references to different web pages, wherein the different references are absent from the first web page, wherein the different references are provided by a host, and wherein the method further comprises
in the other browsing session, presenting in a third area of the window different reduced sized images for the different web pages, wherein the presented different reduced size images are respectively configured for hyperlinking to the different web pages.

5. A method for web browsing with a computer that comprises a display device, comprising:
- tracking browsing patterns of a user based on entries received from the user at the computer over a plurality of browsing sessions;
- storing a history of hyperlinks selected by the user from a particular web page presented on the display device during visitations of the user to the particular web page during the plurality of browsing sessions;
- determining a plurality of hyperlinks from the stored history of hyperlinks, wherein each hyperlink in the plurality of hyperlinks corresponds to a respective web page; and
- when the particular web page is revisited by the user in an other browsing session subsequent to said visitations:
  - presenting for the display device a window that comprises a first area and a second area;
  - presenting the particular web page in the first area of the window; and
  - presenting the plurality of hyperlinks in the second area of the window, wherein each presented hyperlink is presented as a reduced size image associated with said corresponding respective web page, and wherein the reduced size images are presented in an arrangement that reflects prioritization of the corresponding respective web pages.

6. The method of claim 5, wherein the presented window further comprises a third area, and
wherein the method further comprises:
- receiving information from a host that identifies a plurality of other hyperlinks to other web pages; and
- when the particular web page is revisited by the user in the other browsing session subsequent to said visitations, presenting in the third area of the window the other hyperlinks as reduced size images associated with the other web pages.

7. The method of claim 5, wherein the respective web pages are selected by a host as prioritized web pages.

8. The method of claim 5, wherein a host provides information to identify said arrangement.

9. The method of claim 5, wherein presenting the plurality of hyperlinks in the second area of the window comprises:
- presenting, at a first location in the second area, a first hyperlink as a first reduced size image associated with a first web page, wherein the first hyperlink is operative to hyperlink to the first web page;
- presenting, at a second location in the second area, a second hyperlink as a second reduced size image associated with a second web page, wherein the second hyperlink is operative to hyperlink to the second web page; and
- presenting, at a third location in the second area, a third hyperlink as a third reduced size image associated with a third web page, wherein the third hyperlink is operative to hyperlink to the third web page,
- wherein the first location reflects higher prioritization than the second location, and the second location reflects higher prioritization than the third location, and
- wherein the method further comprises, when the user selects a fourth hyperlink for hyperlinking from the particular web page to a fourth web page:
  - removing the third hyperlink from the third location;
  - moving the second hyperlink from the second location to the third location;
  - moving the first hyperlink from the first location to the second location; and
  - presenting, at the first location, the fourth hyperlink as a fourth reduced size image associated with the fourth web page.

10. A method for web browsing comprising:
- over a plurality of browsing sessions, monitoring browsing activity of a user at a particular web page that comprises a plurality of hyperlinks for hyperlinking from the particular web page;
- determining a pattern of hyperlink usage of the user based on the monitored browsing activity;
- determining a prioritized list of hyperlinks based on the determined pattern of hyperlink usage, wherein the prioritized list of hyperlinks comprises a subset of said plurality of hyperlinks, and wherein each hyperlink on the prioritized list links to a respective web page;
- in an other browsing session, presenting a window that comprises a first area and a second area;
- in the other browsing session, presenting the particular web page in the first area of the window;
- in the other browsing session, automatically requesting web page data for the respective web pages; and
- in the other browsing session, presenting in the second area each hyperlink in the prioritized list of hyperlinks, wherein the presented hyperlinks are positioned according to prioritization of the prioritized list, and wherein the presented hyperlinks are presented as reduced size images rendered using said requested web page data.

11. The method of claim 10, wherein the hyperlinks on the prioritized list of hyperlinks are prioritized according to time since last usage, with most recently used hyperlink having highest priority, and
wherein the presented window further comprises a third area for presentation of other hyperlinks identified by a host for hyperlinking to other web pages.

12. The method of claim 10, wherein the prioritized list of hyperlinks comprises a first hyperlink that has highest priority on the prioritized list and a second hyperlink that has lowest priority on the prioritized list,
- wherein the first hyperlink is positioned at a first location in the second area, and
- wherein the method further comprises, responsive to determining that the user has used a third hyperlink via the window subsequent to said presenting in the second area each hyperlink in the prioritized list of hyperlinks:
  - removing the second hyperlink from the second area;
  - moving the first hyperlink from the first location to a second location in the second area; and
  - presenting the third hyperlink at the first location.

13. The method of claim 10, wherein the hyperlinks on the prioritized list of hyperlinks are prioritized according to time since last usage,
- wherein the prioritized list of hyperlinks comprises a first hyperlink, a second hyperlink that has lower priority than the first hyperlink, and a third hyperlink that has lower priority than the second hyperlink,
- wherein the first hyperlink is positioned at a first location in the second area, the second hyperlink is positioned at a second location in the second area, and the third hyperlink is positioned at a third location in the second area, and
- wherein the method further comprises, responsive to determining that the user has used a fourth hyperlink via the window subsequent to said presenting in the second area each hyperlink in the prioritized list of hyperlinks:

moving the second hyperlink from the second location to the third location;
moving the first hyperlink from the first location to the second location; and
presenting the fourth hyperlink at the first location.

* * * * *